H. G. MARTIN AND M. H. NEWGIRG.
BUSHING TIGHTENER FOR LOCOMOTIVE CONNECTING RODS.
APPLICATION FILED APR. 26, 1921.
1,424,505.
Patented Aug. 1, 1922.
2 SHEETS—SHEET 1.
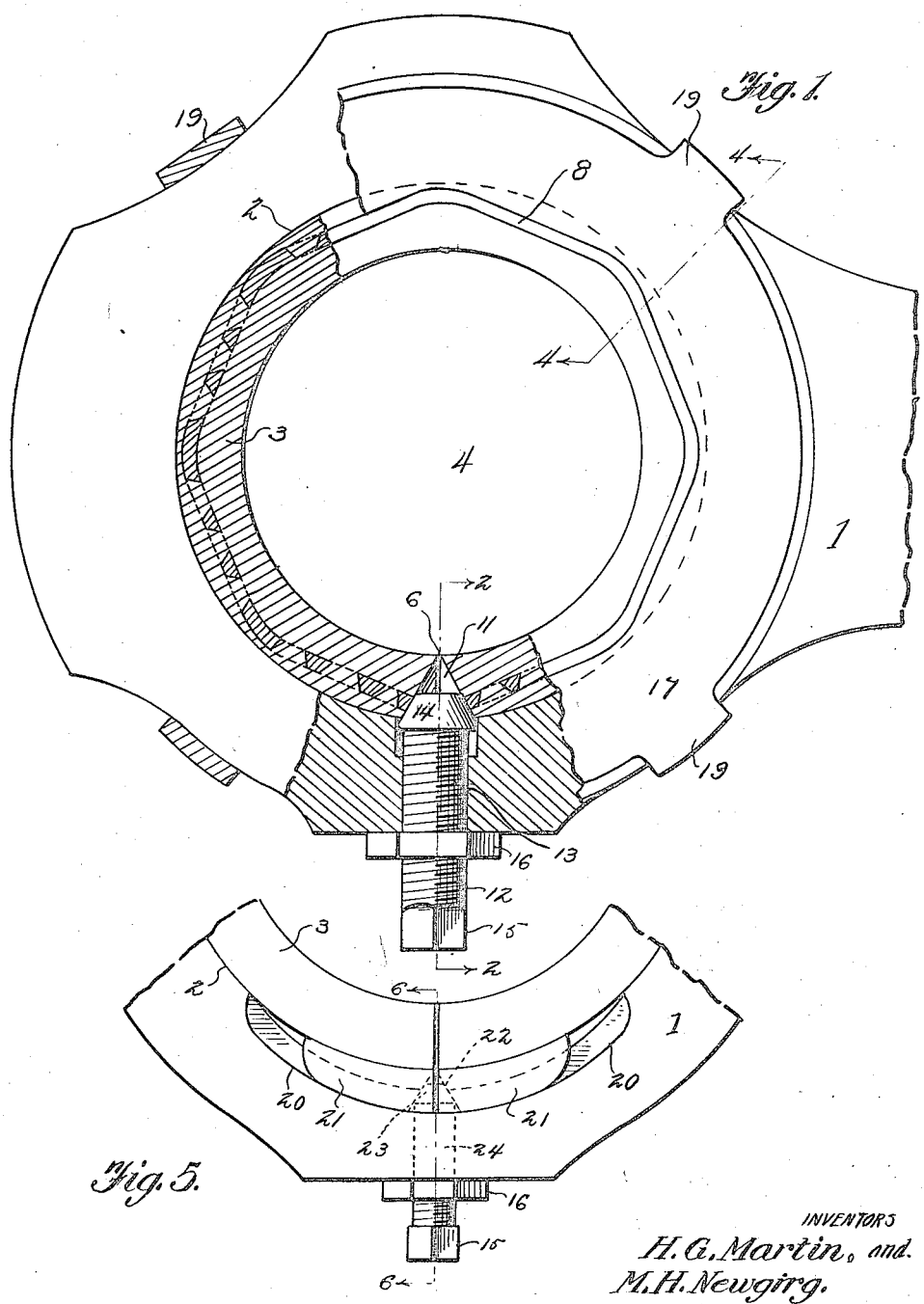
INVENTORS
H. G. Martin, and
M. H. Newgirg.
Atty.

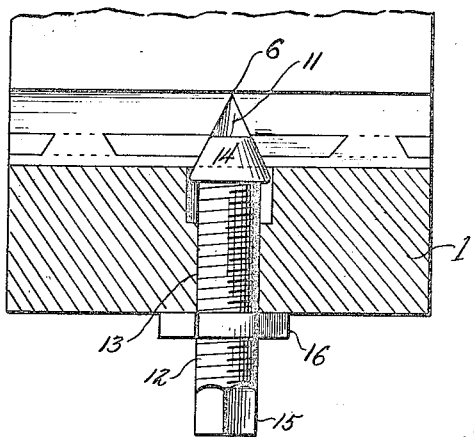
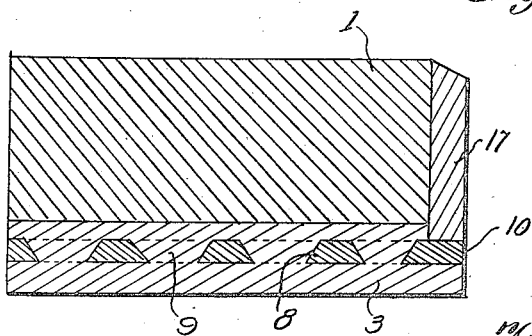
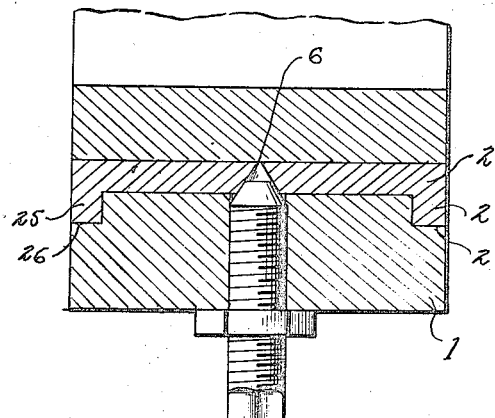
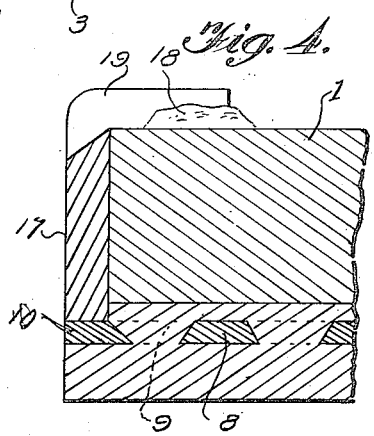

UNITED STATES PATENT OFFICE.

HAROLD G. MARTIN, OF PHILADELPHIA, PENNSYLVANIA, AND MICHAEL H. NEWGIRG, OF BALTIMORE, MARYLAND.

BUSHING TIGHTENER FOR LOCOMOTIVE CONNECTING RODS.

1,424,505. Specification of Letters Patent. Patented Aug. 1, 1922.

Application filed April 26, 1921. Serial No. 464,641.

*To all whom it may concern:*

Be it known that we, HAROLD G. MARTIN and MICHAEL H. NEWGIRG, citizens of the United States of America, residing at Philadelphia, Baltimore, respectively, in the counties of Philadelphia, Baltimore, respectively, and States of Pennsylvania, Maryland, have invented certain new and useful Improvements in Bushing Tighteners for Locomotive Connecting Rods, of which the following is a specification.

This invention relates to an improvement in connecting rods and particularly to a means for binding the bushings or bearings within the rod openings provided therefor, in order to take up any relative play incident to wear, and thereby prevent any looseness or turning of the bushing as would render it unfit for further service.

The invention is particularly directed to providing a manually operable means, whereby the bushing may be tightened in the connecting rod opening and forced into such contact with the walls of the opening as to hold the bushing fixed with relation to the rod.

The invention also relates to the provision of a reinforce for the bushing, which reinforce provides an angular projection beyond the bushing for cooperation with a locking washer secured to the connecting rod. Thus the bushing is prevented from turning.

In the drawings:

Fig. 1 is a view in elevation partly in section illustrating the improved means applied to a bushing in the end of a connecting rod.

Fig. 2 is a section on line 2—2 of Fig. 1.

Fig. 3 is a section on line 3—3 of Fig. 1.

Fig. 4 is a section on line 4—4 of Fig. 1.

Fig. 5 is a view in elevation showing a modified construction.

Fig. 6 is a section on line 6—6 of Fig. 5.

The connecting rod 1 is here shown as formed with an opening 2 to receive a bushing 3 for the pin 4. These parts are of usual construction, except in so far as the specific form of the bushing is concerned. The reciprocating movement of the rod tends to a wear in the opening 2 along the horizontal diameter of said opening, so that eventually the bushing becomes free from and capable of turning in the rod and must then, ordinarily, be replaced. In practice, it has been found that the strain of holding the bushing fixed in the connecting rod is so severe as to loosen the bushing following a comparatively short use thereof.

The present invention is designed to provide a means whereby the bushing may be clamped or wedged into the opening to prevent turning, following any looseness of the bushing, to thereby hold the bushing in fixed relation to the rod for a much longer period of time than is now possible.

In carrying out the invention, it is advisable to provide details of improvement specific to the bushing itself, that is, the bushing may be split longitudinally at 6 at the lower portion.

The bushing is reinforced by a metallic, preferably steel, plate 8, which is of angular or polygonal shape. This reinforce is embedded in the material of the bushing, and is formed with a comparatively large number of holes 9 through which the material of the bushing extends as an integral mass. The holes 9 are preferably countersunk or conical with their maximum diameter toward the outer surface of the bushing, as shown. This reinforce extends beyond one end of the bushing, thereby presenting an end locking member 10, for a purpose hereinafter stated.

The reinforce 8 adjacent the ends formed by the division 6 is formed in the meeting faces to present a wedge recess 11. A pin 12 is threaded through an opening 13 in the connecting rod and provided with a wedge head 14 to cooperate with the walls of the recess 11. The pin 12 has an operating head 15 and is secured in adjusted position by a lock nut 16.

Obviously, proper operation of the pin 12 will force the ends of the bushing or bearing apart, thereby tightening the bushing or bearing within the opening 2 and into fixed contact with the walls of such opening. Thus any wear in the opening 2 tending to a loosening of the bushing or bearing can be compensated for and the bushing or bearing readily locked to the connecting rod to prevent play, and to thereby prevent the necessity for replacement of the bushing or bearing, as heretofore pointed out.

The locking member 10 formed by the projecting end of the reinforce 8, is arranged to be engaged by a locking ring 17, shaped interiorly to accurately fit the exterior of the reinforce 8, and by the bearing thus obtained the bushing or bearing is prevented from turning.

The locking ring may be appropriately secured to the connecting rod, as by welding indicated at 18, there being provided tongues 19 extending from the bushing for this particular method of securing. Obviously, the spreading of the bushing under the action of the pin 12, tends to more tightly interfit the ring 17 and reinforce extension 10.

In Figs. 5 and 6, there is shown a modification of the arrangement, in that the wall of the opening 2 of the connecting rod is cut away in line with and in both directions of the bushing or bearing to provide wedge shaped recesses 20. Wedge blocks 21 fit in these recesses and bear directly against the bushing or bearing. The meeting edges of the blocks are formed to provide a central wedge recess 22, to receive the wedge end 23 of a pin 24, cooperating with the connecting rod as in the preferred form. The wedges 21 preferably, but not necessarily, have marginal flanges 25 seating in recesses 26 in the respectively opposite surfaces of the connecting rod, to thereby prevent loss of the wedge blocks in use.

In this form, as well as in the preferred form, the operation of the pin 24 forces the wedge blocks and so tightens the bushing or bearing and wedges it into binding contact with the wall of the opening 3. The angular reinforce forming the locking member 10 and the locking ring 17 is used in this form also.

From the construction described, it will be apparent that we have provided a means, whereby the bushing or bearings of a connecting rod may be forced into close contact with the wall of the opening in said rod to thereby take up any looseness in the connection and prevent turning of the bushing to avoid the necessity of replacement of the bushing or bearings resulting from such looseness.

As the take up means is operated through a threaded pin, it is apparent that the adjustment may be made to any degree and at any time through the simple turning of the pin, without the necessity of disconnecting any parts, and hence by the present invention, the bushings or bearings may be accurately tightened in their positions in a simple expeditious manner without appreciable loss of time and at practically no cost.

The improvement herein described is designed as a safeguard to the public in preventing accident, and at the same time intended to reduce repair and operating expenses, particularly with reference to locomotives.

It is also apparent that while there is shown and described a single locking member 10, at one end only of the reinforce 8, it is obvious that both ends of said reinforce may be projected to provide locking members, and one or two locking rings 17 correspondingly used. It is not believed this detail requires illustration as it is obviously a duplication of the arrangement shown.

Claims:

1. The combination with a connecting rod and a bushing arranged in an opening thereof, the bushing having a portion projecting beyond the face of the connecting rod, of means for tightening the bushing in the opening in said rod, and means fastened to the connecting rod having interlocking connection with the portion projecting beyond the face of connecting rod for locking the bushing against turning.

2. A connecting rod having a bushing provided with a reinforce of polygonal shape extended beyond one edge of the bushing, a locking ring to be secured to the rod and fitted to embrace the extended portion of the reinforce, and means for spreading the bushing.

3. A connecting rod having a bushing provided with a reinforce of polygonal shape extended beyond one edge of the bushing, a locking ring to be secured to the rod and fitted to embrace the extended portion of the reinforce, and means for spreading the bushing both in said rod and in the locking ring.

4. A connecting rod having a bushing provided with a reinforce of polygonal shape extended beyond one edge of the bushing, said reinforce being embedded in the bushing and formed with a series of holes through which the material of the bushing extends, a locking ring to be secured to the rod and fitted to embrace the extended portion of the reinforce, and means for spreading the bushing.

5. A connecting rod having a bushing provided with a reinforce of polygonal shape extended beyond one edge of the bushing, said reinforce being embedded in the bushing and formed with a series of countersunk holes through which the material of the bushing extends, a locking ring to be secured to the rod and fitted to embrace the extended portion of the reinforce, and means for spreading the bushing.

6. A connecting rod having a bushing provided with a reinforce extended beyond one edge of the bushing, a locking element secured to the rod and fitted to and adapted to interlock with the extended portion of the reinforce, and means for spreading the bushing.

In testimony whereof we affix our signatures.

HAROLD G. MARTIN.
MICHAEL H. NEWGIRG.